United States Patent [19]

Mandelson et al.

[11] 3,901,639

[45] Aug. 26, 1975

[54] SHEET PLASTIC ARTICLE POLISHING APPARATUS

[75] Inventors: David R. Mandelson, Rochester; Leo H. Miller, Penfield; Dunham Briggs Seeley, Fairport, all of N.Y.

[73] Assignee: Burroughs Corporation, Detroit, Mich.

[22] Filed: Dec. 19, 1973

[21] Appl. No.: 425,983

[52] U.S. Cl. .............. 425/371; 425/384; 425/385; 264/284
[51] Int. Cl.² .......................................... B29C 15/00
[58] Field of Search .......... 425/371, 384, 385, 230; 264/293, 284, 322, 280

[56] References Cited
UNITED STATES PATENTS

| | | | |
|---|---|---|---|
| 2,442,443 | 6/1948 | Swallow | 264/284 X |
| 2,574,588 | 11/1951 | Piperoux et al. | 264/280 X |
| 2,675,053 | 4/1954 | Clemens | 425/371 X |
| 2,849,752 | 9/1958 | Leavy | 425/385 X |
| 3,193,888 | 7/1965 | Rochester | 425/371 X |
| 3,371,383 | 3/1968 | Hellsund | 425/371 X |
| 3,621,524 | 11/1971 | Sherwood | 425/371 X |

*Primary Examiner*—Robert L. Spicer, Jr.
*Attorney, Agent, or Firm*—Carl Fissell, Jr.; Kevin R. Peterson; Paul W. Fish

[57] ABSTRACT

Automatic continuously operable apparatus for smoothly finishing plastic material without dimensional distortion or deformation wherein plastic sheets, webs or cards are interleaved between contacting highly polished flexible continuous band-like members adapted to be heated by rotating contact with heated drum members. The flexible members carrying the plastic material are immediately immersed in a cooling solution so that the heat which is applied to the material softens only the surface of the material and wherein the heat is immediately quenched or removed therefrom causing the surface of the member to conform to the highly polished surface of the continuous band-like members thereby to produce a highly glossy finish on the material.

2 Claims, 1 Drawing Figure

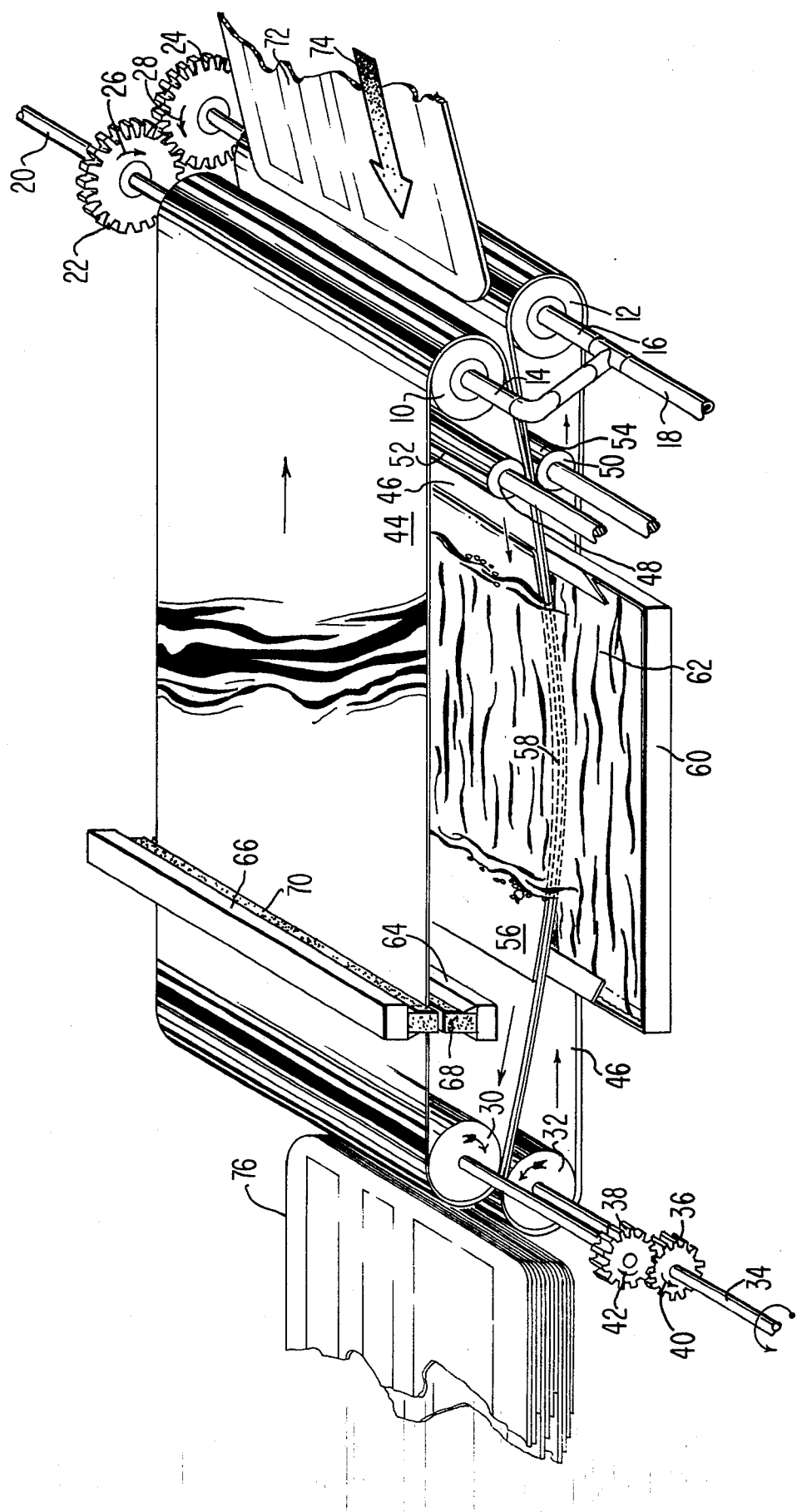
PATENTED AUG 26 1975
3,901,639

SHEET PLASTIC ARTICLE POLISHING APPARATUS

BACKGROUND OF THE INVENTION

The art of producing printed flat plastic articles such as credit cards, identification cards, etc., employs as a treatment what has been characterized in the trade as press polishing. The purpose of this treatment is to produce smooth, highly polished, finished surfaces intended to improve the appearance of the material as well as its resistance to soil. This particular operation ordinarily is performed after any printing which is employed with the material. In the case of printing the ink is a part of the polished surface. In some instances the ink may be protected by overlaying it with a transparent film which can be applied e.g. as by silk screening, roller coating, etc. The material is thereafter dried. Additionally, the surface of the material may have applied thereto a transparent sheet film which can be attached to the base material with transparent adhesive or fused to the base sheet bearing the printing by the application of heat and pressure.

The usual method for press polishing involves interleaving the plastic sheets between thin metal members which are highly polished on both surfaces. Several layers of material are placed in the press along with a layer of resilient and compressible material and disposed between flat platens. In the case of the hydraulic or mechanical press the material is subjected to relatively high pressure, first with the platens heated and then with the platens chilled or cooled. This treatment causes the plates to bend and the plastic to flow sufficiently so there is complete contact between the plastic surfaces and the polished metal surfaces. The result is a molded plastic surface material. In those instances where the ink is protected by a sheet film overlay the heat fusing described takes place during this operation and it is the outside surface of the protecting films which are molded smooth.

A number of inherent disadvantages immediately present themselves. The interleaving and deleaving is costly. The mass of the platens, multiple layers and the heat transfer characteristics of these members necessarily require relatively long heating and cooling cycles and complete heating throughout the layers cannot be avoided. The effect of all of this is plastic flow of the entire plastic mass, not just the surface. This results in dimensional distortion or deformation.

It is an important and primary object of the present invention, therefore, to avoid the foregoing problems and in a new, novel, and heretofore undisclosed manner by the creation of a smooth surface on plastic material sheets, cards, etc., without dimensional distortion or other structural deformation.

SUMMARY OF THE INVENTION

In accordance with the present invention, there is provided novel apparatus for producing smooth surfaced plastic material which includes two pairs of rotatable drums around the peripheral surface of each opposite pair of which there is wrapped a continuous loop of highly polished slightly flexible and smoothly surfaced metallic band or belt. At the input end of the structure the confronting drums are provided with means for elevating the temperature of the drums to a relatively high heat such as by the introduction of steam, hot water, or heated oil. At the output end of the apparatus means is provided for ejecting the material carried by the confronting bands or loops of material and stacking the same in a hopper. Adjacent the nip of the heated rollers are located a pair of squeeze rollers covered with a suitable heat resistance resilient material.

The belts are obliged to move around an arcuate surface member which causes the belts to take an arcuate path from the input to the output end. The arcuately shaped member is disposed within a coolant bath which may be water or other coolant material and from which the belts are fed to the take-up rollers. Adjacent the upper surface of the rollers or of the uppermost belt are a pair of squeegees rubber-like bars through which the belt is obliged to pass and from which the coolant material is squeezed or exuded so as to completely dry the surface of the belt.

In operation the plastic material, e.g. a credit card, is fed into the input bight of the belts. The surface of the plastic is heated due to the fact that the thin metal belts are forced into complete contact with the plastic by the resilient squeeze rolls. The plastic is softened so that the surface adheres the plastic completely to the belt. The arcuate path caused by the arcuately shaped member eliminates any tendency for this adhesion to be disturbed. The "metal-plastic-metal laminate" thus created is chilled in its passage through the coolant material permitting the plastic to emerge in a solidified form. Since the solidified surface no longer adheres to the belts, the plastic sheet can be dropped off at the output end into a collector or container. The heat transferred to the plastic is only sufficient to soften the surface of the plastic and the squeeze rolls exert only enough pressure to make the belts conform to the macro-surface contour of the plastic. The time the plastic takes to pass through the nip of the rollers to the coolant is only long enough to make the surface flow and adhere to the belts. The net result is a polished molding of the surface only.

BRIEF DESCRIPTION OF THE DRAWING

The single FIGURE of the drawing illustrates in isometric view, the assembled apparatus of the present invention.

PREFERRED EMBODIMENT OF THE INVENTION

The preferred embodiment of the present invention, as described and claimed herein, is illustrated in a single FIGURE of drawing and is seen therein to include an upper and a lower input roller 10 and 12 respectively, which are or may be of the hollow drum like variety having a smooth, substantially unblemished surface, although not necessarily polished. Each drum member 10 and 12 is adapted to be heated as by fluid retention and to this end external pipes or conduits 14 and 16, coupled to an inlet pipe 18, are attached thereto, as shown. Inlet pipe 18 may be provided with heated oil, water or steam, for example, from a source not shown, which is maintained at a relatively elevated temperature so as to maintain the rollers or drums at the desired temperature for the purpose of the present invention. A drive motor not shown is adapted to rotate the two rollers by means of the shaft 20 and the engaged drive gears 22 and 24 in the direction of the arrows 26 and 28.

At the opposite end of the apparatus are located two take-up rollers 30 and 32, similar in size to rollers 10 and 12, but not of the hollow drum like variety. Rollers 30 and 32 are driven from a motor not shown, by means of the drive shaft 34 and the engaged gears 36 and 38 in the direction of arrows 40 and 42.

Upper and lower stainless steel webs or belts 44 and 46 respectively, are arranged over upper rollers 10 and 30 and rollers 12 and 32 respectively, so as to be placed under a desired degree of tension. The longitudinal separation between roller pairs is adjustable to accommodate changes in belt size or length, as desired.

Arranged adjacent to the input drive rollers 10 and 12 are two squeeze rollers 48 and 50. The arcuate surface portion of these rollers are covered with a suitable heat resistant, resilient material 52 and 54. The rollers are arranged to press the confronting surfaces of the upper and lower belts or bands together as shown, as that the area therebetween is tightly compressed thereby to engage and squeeze any material which passes through the nip of the rollers 10 and 12 and into and between the two belts.

Intermediate the two pairs of rollers is located and arcuately shaped, contoured projecting member 56. The lower surface portion 58 of which is provided with a radius extending from aft of the squeegee rollers 48 and 50 to a position just ahead of the take-up rollers 30 and 32. The member 56 is positioned so as to cause the flexible belts 44 and 46 to pass thereover as they make the run from the input rollers to the take-up rollers effectively placing the belts in an arcuate shape. The member 56 is adapted to extend into a container member 60 located there beneath in such manner that the lower radial portion of member 56 over which the belts pass is immersed in a coolant material 62 such as water which is employed to immediately quench the heated belts and the plastic carried thereby.

Since the polished bands or belts 44 and 46 inevitably pick-up some of the coolant material 62 as they pass through the coolant 60, a pair of oppositely disposed squeegee members 64 and 66 are provided. Members 64 and 66 are arranged with their flexible, absorbent surfaces 68 and 70 in confronting, contacting relationship to the belt 44. The pressure between the surfaces 68 and 70 is sufficient to remove any residual coolant material from belt 44 and thereby prevent any material such for example as water marks from marring the smooth glossy finish being applied to the incoming plastic material.

This apparatus is adapted to be operated automatically and to this end the input end of thereof may be provided with an automatic feed unit which feeds the plastic material 72 in the direction of the arrow 74 into the nip of the two heated rollers 10 and 14. The material is thereafter transported by the belts 44 and 46 between the squeeze rollers 48 and 50 where the surface only of the plastic is slightly softened and the material is thereafter carried into the coolant material where it is solidified and at this point highly polished to be ejected by the rollers 30 and 32 in its polished condition into a take-up bin in a stack form as indicated by reference character 76.

In practice of the invention it is necessary to arrive at a combination of belt thickness, drum temperature at the input end of the apparatus and a surface speed which is sufficient to transfer only enough heat to soften the surfaces of the particular plastic being polished. Thus, there must be a relationship between the flatness and stiffness of the belt material and the plastic and the adhesive characteristics of the softened surfaces of this material so that once contact with the metal to plastic is made there will be no loss of such metal to plastic contact until the plastic surface has been sufficiently chilled by the coolant material so as to retain its smooth polished finish.

The technique set forth herein above lends itself equally well as do the basic principals of the mechanism to the polishing of a variety of thermoplastic materials. There are a variety of ways to heat and chill the belts to guide them in a path so as to minimize their tendency to lose contact once such contact is made and to make the initial contact. The present invention contemplates and involves the use of a pair of smooth metal belts of suitable thickness heated to a temperature so that they only contain sufficient heat, quantitatively, to soften the surface of the plastic material used therewith but not soften the interior structural base of this material. A combination of squeeze pressure, belt stiffness and squeeze roll resiliency is employed so that the belts are made to completely conform to the macro-surface irregularities of the plastic at the nip of the input end rollers. A combination of belt speed, plastic surface adhesiveness when softened, and belt stiffness is employed such that contact is completely maintained through the coolant section after once made by the squeeze rolls.

There has thus been described a new novel and heretofore undisclosed method and apparatus for producing highly polished plastic material from plastic material web sheets or cards. The apparatus is relatively simple to maintain once in operation and the equipment can be automated so as to produce a relatively high volume of completely polished material in a relatively short time.

Other and different plastic surface finishes are available by altering the surface finish of the belts or bands. Thus a textured surface may be formed by texturizing the belt surfaces.

The belts can be heated in a variety of ways for example as by electrically heating the drums, applying radiant heat to the drums, utilizing induction heating techniques or resistance heating of the belts.

What is claimed is:

1. Apparatus for polishing the back-to-back surfaces of relatively flat plastic sheet-like articles having a relatively thin cross-section dimension between said back-to-back surfaces, said apparatus comprising: first and second rotatable endless belts, each belt having an inside surface and an outside surface, said first and second belts being arranged relative to each other such that substantial portions of their outside surfaces are in contacting face-to-face relationship, said outside surfaces of each belt having a high gloss, mirror-like finish, each belt being made of flexible metallic material which is adapted for retaining heat at a relatively high temperature for a controllable period of time; a first pair of longitudinally spaced-apart rolls mounted within said first belt and in contact with said inside surface thereof, one roll of said first pair of rolls being adapted for being rotatably driven so as to rotate said first belt and thereby rotatably drive the other roll of said first pair of rolls, said other roll of said first pair of rolls having an enclosed chamber therein; a second pair of longitudinally spaced-apart rolls mounted within said second belt and in contact with said inside surface thereof, one roll of said second pair of rolls being adapted for being rotatably driven so as to rotate said second belt and thereby rotatably drive the other roll of said second pair of rolls, said other roll of said second pair of rolls having an enclosed chamber therein, said one rolls, of said first and second pair of rolls being situated adjacent each other and said other rolls of said first and second pair of rolls being situated adjacent each other; first means for rotatably driving said one rolls of said first and second pairs of rolls whereby said first and second endless belts as well as said other rolls of said first and second pairs of rolls are rotated synchronously so that said contacting face-to-face outside surfaces of said first and second belts move at substantially the same linear speeds in the same direction, said same direction being in a direction from said adjacent other rolls toward said adjacent one rolls; second means for delivering a heated fluid to said enclosed chambers of said other rolls of said first and second pair of rolls so as to enable transfer of heat from said fluid and other rolls to said first and second endless belts thereby elevating the temperatures of said belts to a relatively high temperature; first and second squeeze rollers situated within said first and second endless belts, respectively, and adjacent said other rolls of said first and second pair of rolls, said first and second squeeze rollers being in pressure contact with the inside surfaces of said belts so as to force the outside surfaces of said belts into face-to-face contacting relationship; a stationary arcuate member situated within said first endless belt and contacting the inside surface of said first endless belt so as to force the face-to-face contacting outside surfaces of said first and second belts to follow an arcuate path as said first and second belts move in the aforesaid same direction; and, third means adapted for retaining a heat quenching liquid, said third means being located with respect to said arcuate member and said face-to-face contacting outside surfaces of said belts such that said belts move in an arcuate path through said third means and are contacted by the heat quenching liquid.

2. The apparatus set forth in claim 1 further comprising a pair of squeegee members contacting the inside and outside surfaces of at least one of said belts for removing residual quenching liquid on said surfaces.

* * * * *